US008805039B2

(12) United States Patent
Homman et al.

(10) Patent No.: US 8,805,039 B2
(45) Date of Patent: *Aug. 12, 2014

(54) IDENTIFICATION AND CLASSIFICATION OF VIRUS PARTICLES IN TEXTURED ELECTRON MICROGRAPHS

(75) Inventors: Mohammed Homman, Nacka (SE); Martin Ryner, Stockholm (SE)

(73) Assignee: Intelligent Virus Imaging Inc, Southern Pines, NC (US)

(*) Notice: Subject to any disclaimer, the term of this patent is extended or adjusted under 35 U.S.C. 154(b) by 72 days.

This patent is subject to a terminal disclaimer.

(21) Appl. No.: 13/491,628

(22) Filed: Jun. 8, 2012

(65) Prior Publication Data

US 2012/0250975 A1 Oct. 4, 2012

Related U.S. Application Data

(63) Continuation-in-part of application No. 12/065,514, filed as application No. PCT/US2006/035758 on Sep. 12, 2006, now Pat. No. 8,238,627.

(60) Provisional application No. 60/725,806, filed on Oct. 12, 2005.

(51) Int. Cl.
*G06K 9/00* (2006.01)

(52) U.S. Cl.
USPC .......................................................... 382/128

(58) Field of Classification Search
None
See application file for complete search history.

(56) References Cited

U.S. PATENT DOCUMENTS

| 6,633,655 | B1 * | 10/2003 | Hong et al. | 382/118 |
| 6,701,174 | B1 * | 3/2004 | Krause et al. | 600/407 |
| 6,876,367 | B2 * | 4/2005 | Wada et al. | 345/690 |
| 8,131,058 | B2 * | 3/2012 | Shimura | 382/149 |
| 8,285,058 | B2 * | 10/2012 | Sarkar | 382/209 |
| 2004/0234116 | A1 * | 11/2004 | Bi et al. | 382/132 |
| 2005/0210281 | A1 * | 9/2005 | Enomoto | 713/200 |
| 2005/0232478 | A1 * | 10/2005 | Onishi et al. | 382/149 |
| 2008/0166035 | A1 * | 7/2008 | Qian et al. | 382/133 |
| 2008/0175464 | A1 * | 7/2008 | Brett et al. | 382/131 |
| 2008/0310737 | A1 * | 12/2008 | Han et al. | 382/224 |
| 2009/0297015 | A1 * | 12/2009 | Jetzek | 382/133 |
| 2011/0255761 | A1 * | 10/2011 | O'Dell et al. | 382/131 |
| 2012/0015825 | A1 * | 1/2012 | Zhong et al. | 506/6 |

OTHER PUBLICATIONS

A Garrido, N Perez de la Blanca. "Applying deformable templates for cell image segmentation" Pattern Recognition, vol. 33, 2000.*
Jang et al. "Shape Recognition of Embryo Cell Using Deformable Template for Micromanipulation" Springer-Verlag Berlin Heidelberg 2004, IEA/AIE 2004, LNAI 3029, pp. 463-472, 2004.*
Stoschek & Hegerl, "Automated Detection of Macromolecules from Electron Micrographs Using Advanced Filter Techniques", Journal of Microscopy, vol. 185, pt. 1, Jan., 1997, p. 76-84.
Jain et al. "Object Matching Using Deformable Templates", IEEE Transactions on Pattern Analysis and Machine Intelligence, vol. 18, No. 3, Mar. 1996, p. 267-277 (Mar. 26, 2014).
Kuznetsov, et al. "Structural Transitions of Satellite Tobacco Mosaic Virus Particles," Virology, 284, p. 223-234. (Apr. 4, 2014), Year 2001.

* cited by examiner

*Primary Examiner* — Barry Drennan
*Assistant Examiner* — Oneal R Mistry
(74) *Attorney, Agent, or Firm* — Fasth Law Offices; Rolf Fasth

(57) ABSTRACT

The method is for the identification and characterization of structures in electron micrographs. Structures in a first image are selected. The structures have a first shape type deformed in a first direction. The selected structures are transformed to a second shape type different from the first shape type. The transformed structures of the second shape type are used to form a plurality of templates. A new structure in a second image is identified. The new structure has the first shape type. The second shape type structure of each template is deformed in the first direction. It is determined which template is a preferred template that best matches the new structure.

10 Claims, 10 Drawing Sheets

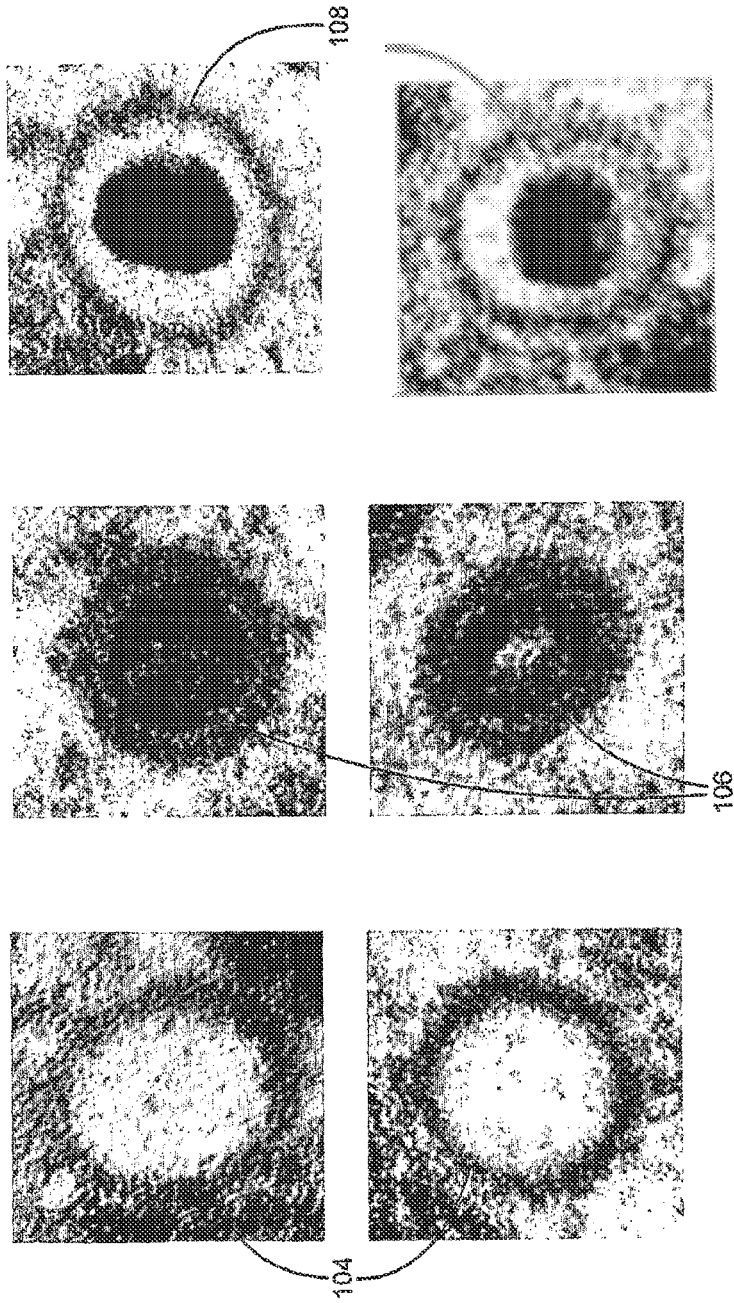

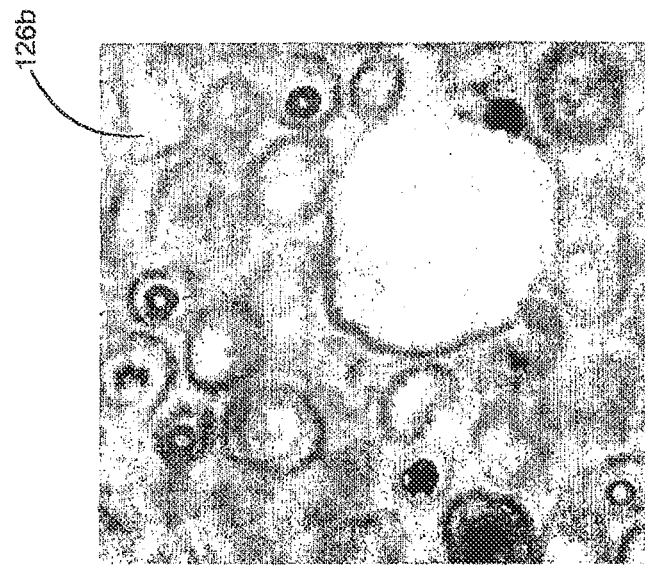
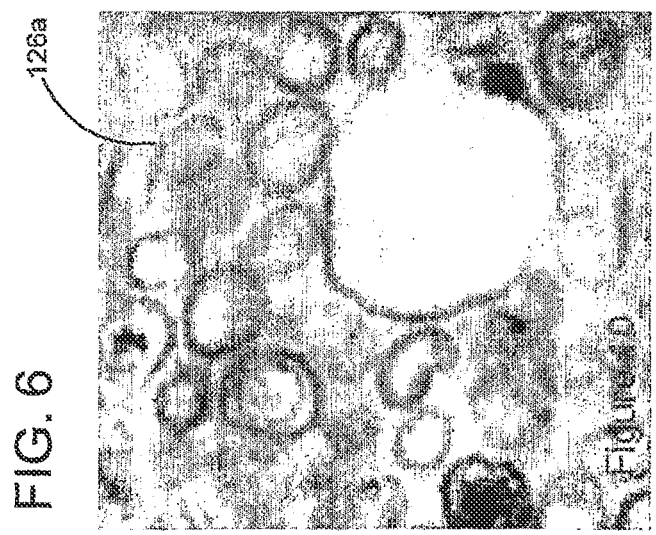
FIG. 6

IDENTIFICATION AND CLASSIFICATION OF VIRUS PARTICLES IN TEXTURED ELECTRON MICROGRAPHS

PRIOR APPLICATIONS

This is a continuation-in-part patent application that claims priority from U.S. patent application Ser. No. 12/065,514, filed 3 Mar. 2008 that claims priority from International PCT Application. No. PCT/US2006/035758, filed 12 Sep. 2006 that claims priority from U.S. Provisional Patent Application No. 60/725,806, filed 12 Oct. 2005.

FIELD OF THE INVENTION

The present invention relates to identifying structures in images. In particular, the present invention provides a method and an arrangement of identification and classification of virus particles in textured electron micrographs.

BACKGROUND OF THE INVENTION

Virus assembly is an intricate process and a subject of intensive research. Viruses utilize a host cell to produce their progeny virus particles by undergoing a complex process of maturation and intracellular transport. This process can be monitored at high magnification utilizing electron microscopy, which allows visual identification of different types of virus particles in different cellular compartments. Important issues that remain to be resolved include the identity of the viral proteins that are involved in each step of this virus assembly process as well as the mechanism of the underlying intracellular translocation and localization of different types of virus particles during virus maturation. Structural aspects of the virus maturation are generally hard to address although visualization techniques such as tomography and cryo EM have contributed tremendously to the vast information on virus structures. These techniques provide information on stable, often mature virus particles. Genetic tools are available to produce mutants of key viral protein components, and the structural effects can be visualized by EM. However, the lack of proper tools to characterize the structural effects, especially intermediate and obscure particle forms and to quantify it properly in an objective way. Image analysis tools to characterize and quantify virus particle maturation and intracellular transport would facilitate objective studies of different virus assembly states using electron microscopy. A lot of information is acquired but need to be structured and statistics produced from it to evaluate the effect and draw conclusions.

SUMMARY OF THE PRESENT INVENTION

Characterization of the structural morphology of virus particles in electron micrographs is a complex task, but desirable in connection with investigation of the maturation process and detection of changes in viral particle morphology in response to the effect of a mutation or antiviral drugs being applied. Therefore, a procedure has been developed for describing and classifying virus particle forms in electron micrographs, based on determination of the invariant characteristics of the projection of a given virus structure. The template for the virus particle is created on the basis of information obtained from a small training set of electron micrographs and is then employed to classify and quantify similar structures of interest in an unlimited number of electron micrographs by a process of correlation. Using linear deformation analysis, this novel algorithm described here can handle virus particle variations such as ellipticity and furthermore allows evaluation of properties such as the size and orientation of a virus particle. Practical application of the method is demonstrated by the ability to locate three diverse classes of virus particles in transmission electron micrographs of fibroblasts infected with human cytomegalo-virus.

In summary, the method is for the identification and characterization of structures in electron micrographs. Structures in a first image are selected. The structures have a first shape type deformed in a first direction. The selected structures are transformed to a second shape type different from the first shape type. The transformed structures of the second shape type are used to form a plurality of templates. A new structure in a second image is identified. The new structure has the first shape type. The second shape type structure of each template is deformed in the first direction. It is determined which template is a preferred template than best matches the new structure.

BRIEF DESCRIPTION OF THE DRAWINGS

FIG. 2A shows empty herpes virus nucleo-capsids;

FIG. 2B shows herpes virus nucleo-capsids with a translucent core;

FIG. 2C shows herpes virus nucleo-capsids containing packaged DNA;

FIG. 6 shows matching with the test function A inside of a vesicle.

DETAILED DESCRIPTION

The development of an automated system to assist in the identification of virus particles and infectious agents such as bacteria in electron micrographs is herein described. The current invention is not limited to virus and infectious agents, such as bacteria, but could also include proteins, antibodies, liposomes and other such substances. Virus particles have only been used as an illustrative example and the present invention is not limited to viral/virus particles. The same principles of the present invention may be applied to infectious agents and the other substances mentioned above. As a model, fibroblasts have been used that are infected with human cytomegalovirus (HCMV) a virus of the β-herpes class. It should be understood that the herpes virus is only used as an illustrative example and the invention is not limited to the herpes virus. During infection with human cytomegalovirus, many different intermediate forms of the virus particle are produced. During assembly of the herpes virus, the host cell is forced to make copies of the viral genetic material and to produce capsids, a shell of viral proteins, which encase and protect the genetic material. Capsids are spherical structures that can vary with respect to size and symmetry and may, when mature be enveloped by a bi-layer membrane. The maturation of virus capsids is an important stage in virus particle production, and one that is frequently studied. However, their appearance in electron micrographs varies considerably which makes analysis a challenge. A unique feature or herpes viruses is the tegument, a layer of viral proteins that surround the capsid prior to final envelopment. The envelope is acquired by budding of tegumented capsids into secretory vesicles in the cytoplasm. Thereafter, infectious virus particles exit the host cell by fusion of these virus containing vesicles with the plasma membrane.

An objective procedure for the classification and quantifying of virus particles have been developed, in such transmission electron micrographs. In the related, analysis of cryo-electron microscopic (cryo-EM) images, considerably more effort has been devoted to exploring different methods of identification. In cryo-micrographs, cross correlation employing multiple templates and methods for edge detection have been applied successfully.

Figure 1B:
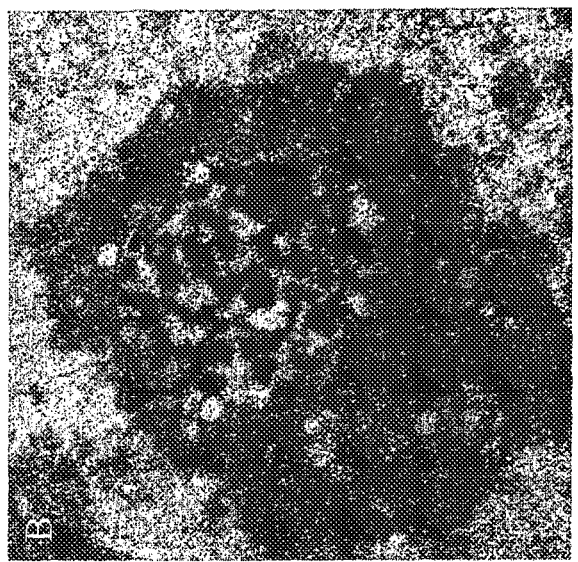
FIGS. 1A and 1B show typical transmission electron micrograph images of developing herpes virus.
Figure 1A:
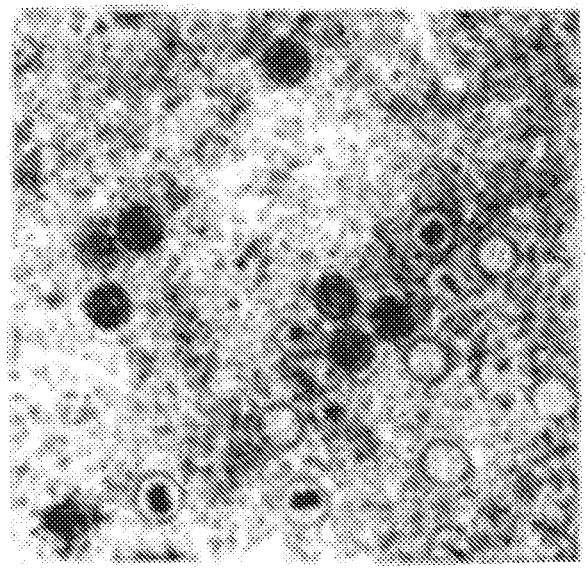

Suitable approaches allowing characterization and quantification of the maturation of virus particles and their intracellular translocation facilitate objective studies of these phenomena employing electron microscopy. However, the electron microscope images are difficult to analyze and describe in an objective way because of their heavily textured background. In addition, individual virus particles display a wide variety of shapes, depending on their projection in the electron micrograph, the procedure utilized to prepare samples for electron microscopy and the settings used for photography. Typical electron micrographic images 100, 102 which provide valuable information are shown in FIGS. 1A and 1B, respectively.

In the present invention, an approach has been applied to the analysis of HCMV capsids in the nucleus of infected cells that are at defined states of maturation such as empty capsids 104 (called A), capsids with a translucent core 106 (called B) and capsids containing packaged DNA 108 (called C), as best shown in FIGS. 2A-C.

The method and arrangement according to the present invention is illustrated with virus particles. This should be seen as a non-limiting example. Other type of particles, including for example biological objects such as cells or cell structures, but also non-organic particles and structures, may be identified and characterized with minor modifications to the described method and arrangement.

The method according to the invention includes an image acquisition step. The electron micrograph may be provided from the electron microscope as files or pictures to be scanned it is for the further steps of the method preferably to achieve and store knowledge of pixel size, resolution and enlargement for each micrograph.

In a pre-processing step, the relevant particles are selected and transformed from possible deformed appearances to circles.

In a step of forming templates, selected and transformed particles are used to form a template, which may be characterized by a test function.

In a matching step, the template or test function, is utilized to identify particles in further image(s). The steps of the method will be further described and exemplified below.

An identification and classification apparatus according to the present invention may be based on a general personal computer with sufficient calculation power. The identification and classification apparatus is provided with an interface for receiving micrographs, pre-processing means for transforming the deformed images, means for forming the templates or extracting test functions and means for performing a matching procedure. These steps are typically and preferably carried out by software code modules.

Cell cultures such as human embryonic lung fibroblasts (HF) were maintained in bicarbonate-free minimal essential medium with Hank's salts (GIBCO ERL) supplemented with 25 mM HEPES [4-(2 hydroxyethyl)-1-piperazine ethanesulfonic acid], 10% heat-inactivated fetal calf serum, L-glutamine (2 mM), penicillin (100 U/ml) and streptomycin (100 mg/ml) (GIBCO BRL, Grand Island, N.Y., USA). The cells were cultured in 175 cm$^2$ tissue culture flasks (Corning, N.Y., USA) for a maximum of 17 passages.

In a viral infection step, the HF cells were infected with HCMV strain AD169 employing a multiplicity of infection (MOI) of 1. The virus containing supernatants were collected 7 or 10 days post-infection (dpi), cleared of cell debris by low-speed centrifugation and frozen at −70° C. until used for inoculation.

In order to examine virus-infected cells by electron microscopy, uninfected and HCMV-infected cells were harvested at 1, 3, 5, and 7 dpi and thereafter fixed in 2% glutaraldehyde in 0.1 M sodium cacodylate buffer containing 0.1 M sucrose and 3 mM $CaCl_2$, pH 7.4 at room temperature for 30 min. The cells were then scraped off with a wooden stick and transferred to an Eppendorf-tube for continued fixation overnight at 4° C.

Following this procedure, the cells were rinsed in 0.15 M sodium cacodylate buffer containing 3 mM $CaCl_2$, pH 7.4 and pelleted by centrifugation. These pellets were then post-fixed in 2% osmium tetroxide dissolved in 0.07 M sodium cacodylate buffer containing 1.5 mM $CaCl_2$, pH 7.4, at 4° C. for 2 hours; dehydrated sequentially in ethanol and acetone; and embedded in LX-112 (Ladd, Burlington, Vt., USA). Contrast on the sections was obtained by uranyl acetate followed by lead citrate and examination performed in a Philips 420 or a Tecnai 10 (FEI Company, Oregon, USA) transmission electron microscope at 80 kV.

Image acquisition, discretization and analysis then followed. Electron micrographs of HCMV-infected HF cells were digitalized employing an 8-bit gray scale at a resolution of 5.5 nm/pixel, in a HP Scanjet 3970. The implementation was performed with Matlab 7.0.1 (The Mathworks Inc., Natick, Mass., USA) and Sun Java 1.1.2 software on a Dell Optiplex GX260 personal computer. This analysis involved an easy-to-use graphical interface and automation of the parameters described below for rapid and convenient use.

User-friendly and reliable tools for studies of intracellular virus assembly were then developed. The approach was based on finding a compact set of points in $R^2$, the field of the micrograph, for each of which a point has a corresponding function value. This set of points and their function values are collectively referred to as a test function or template and can be described by a sequence $\{(x_k, c_k)\}_k$ where x is the point and c is the function value. The test function is preferably produced in such a fashion that the sequence of function value is correlated to the values on the gray scale of the corresponding points. Accordingly, a defined set of virus particles of the same type is required in order to train and design the sequence to provide a template for this specific particle structure. This sparse representation allows facile deformation and adjustments of the template to individual virus particles which shape in the micrograph is more-or-less elliptical or asymmetrical.

In a deformation pre-processing step, the positions of the substructures within the same type of viral particles vary in the different images. For example, the virus particles are sometimes deformed in such manner as to appear in different elliptical or asymmetrical forms. In order to create the test functions, linear vector spaces were used which demands that the vector space positions analyzed are relatively fixed. Uniform linear transformation was chosen to approximate the deformations, since it covers the most prominent deformations seen in micrographs. The computational cost of these calculations is fairly low and simplifies the management of boundaries. This approach often requires the use of a 4-dimensional transformation operator, i.e., a 2×2 matrix. These variables involved can be expressed as the rotation of the structure prior to deformation ($\phi_R$), the primary radial deformation ($\bar{r}$), the rate of the deformation giving rise to the elliptical structure (d) and the rotation following the deformation ($\phi_D$). Together these form the transformation shown below:

$$T = R_D D R_R = \begin{pmatrix} \cos\varphi_D & -\sin\varphi_D \\ \sin\varphi_D & \cos\varphi_D \end{pmatrix} \begin{pmatrix} \bar{r}d & 0 \\ 0 & \bar{r}/d \end{pmatrix} \begin{pmatrix} \cos\varphi_R & -\sin\varphi_R \\ \sin\varphi_R & \cos\varphi_R \end{pmatrix} \quad \text{(eq. 1)}$$

Figure 3A:
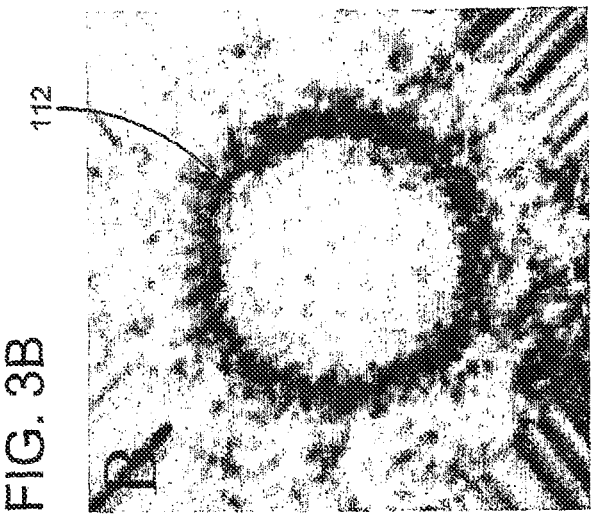
FIG. 3A shows a virus particle with an asymmetrical or elliptical shape.
Figure 3B:
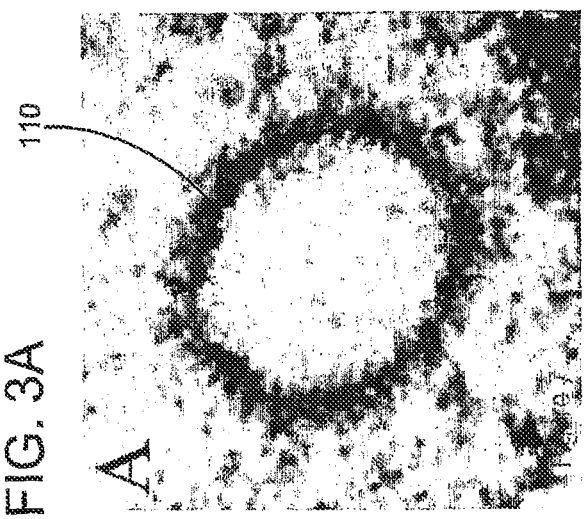
FIG. 3B shows a virus particle that has been deformed to make it circular.

In order to identify the variables of the transformation for an individual virus particle, an ellipse set manually was used to estimate the position, size and deformation of each capsid wall, as best shown in FIGS. 3A and 3B. Image 110 (called A) has an elliptical shape while image 112 (called B) has been deformed as described to make it more circular shaped. Thus providing three ($\phi_D$, $\bar{r}$ and d) of the four variables. The sample was then partially transformed to obtain the primary radius measured without deformation (d=1), as illustrated in FIG. 3B.

Features that are independent of rotation such as the polygonal architecture of the capsid wail and position of the DNA core may be determined by the $\phi_R$, value for each sample. In order to find this value, each partially transformed sample may be normalized around its mean in the interior of a circle covering the visually significant area of the images 114a, 116a and 118a, as shown in the left column of FIGS. 4A-C. Then, the sum of the squares of the distances in the $L^2$-sence for each sample may be minimized with respect to the angles. Since this minimization involves N−1 variables, with N being the number of reference samples considering one sample to be fixed, this procedure may be simplified by minimizing the distances to the samples already processed one-by-one. All transformations of the images may then be implemented in a bi-linear fashion, thereby approximating the value of function $f$ at point (x, y) as:

$$f(x,y)=f(\underline{x},\underline{y})(1-x_m)(1-y_m)+f(\overline{x},\underline{y})x_m(1-y_m)+ f(\underline{x},\overline{y})(1-x_m)y_m+f(\overline{x},\overline{y})x_m y_m$$

where $\underline{x}$ is the nearest smaller integer value of x, $\overline{x}$ is the closest higher integer value and $x_m = x-\underline{x}$. Integration may be performed using the same interpolation. The measurements obtained from this processing step provide indications of the range of the deformation properties, i.e., the main radii (primary radius) and deformation rate, but these parameters should be determined on the basis of additional experience. Since all types of rotation and all directions of deformation of the viral structures are expected to be present in the electron micrographs, these variables are preferably not fixed.

The points and local function values (parameters) for the virus particle templates may then be identified. Once the deformed samples are aligned with the partial structure at the same positions, this approach can be used to find the values of the invariant function. In order to describe this procedure more clearly, a deformed sample f can be converted into a graph of this function by enumerating (list individually) the pixel positions x and their corresponding function values c as $f=\{(x_k, c_k)\}_k$. The degree of matching between two sequences of function values $y_i$ and $y_j$ (referred to below as vectors) containing the same sequence of pixel positions was determined using the standard estimated statistical correlation:

$$M(y_i, y_j) = \frac{\langle y_i - \overline{y}_i, y_j - \overline{y}_j \rangle}{\|y_i - \overline{y}_i\| \|y_j - \overline{y}_j\|} \quad \text{(eq. 2a)}$$

Where $\overline{y}$ is the mean value of she vector and the matching of all coefficients to [−1, 1] is mapped. The rationale for using this approach is that it indicates the degree of linearly similarity between the two structures. After placing the sample vectors normalized around their mean $$\hat{y}_i = \frac{y_i - \overline{y}_i}{\|y_i - \overline{y}_i\|}$$

into columns in a matrix, the test function sequence $f_c$ ($\|f_c\|=1$) that makes $\|A^T f_c\|$ as large as possible is determined, thus providing the best match to the samples used for training.

Singular value decomposition (SVD) may be described as follows:

$$\|A^T f_c\| = \|V \Sigma U^T f_c\| = (V \text{ is square and orthonormal}) = \|\Sigma U^T f_c\| = \|\Sigma w\|$$

is applied to A where $\|w\|=1$ if $f_c \in \text{span}(U)$ which would be expected. This last expression is maximal when w is the eigenvector corresponding to the largest eigenvalue of $\Sigma$ (which is the largest singular value) and $f_c$ should thus be the corresponding column of U. Since this function is a linear combination of the columns in A, the matching (eq. 2a) reduces to $$M(f_c, y) = \frac{\langle f_c, y \rangle}{\|y - \overline{y}\|} \quad \text{(eq. 2b)}$$

The test function in this initial SVD utilizes the coefficients of all points associated with the first support assumed. Some of these points are located somewhat outside of the viral structures in the images, and in addition, there are points in the structures which coefficients can vary considerably. Thus, in order to rank the significance of each coefficient and thereby eliminate the worst of the variance, the value of $$VAR_j = \sum_{n=1...N} \left( [\hat{y}_n - \langle f_c, \hat{y}_n \rangle f_c]_j \right)^2$$

was calculated for each coefficient. A certain percentage of the points could then be retained in the test function. Since these operations change on the basis of the test function, a new SVD was subsequently calculated.

Figure 4A:
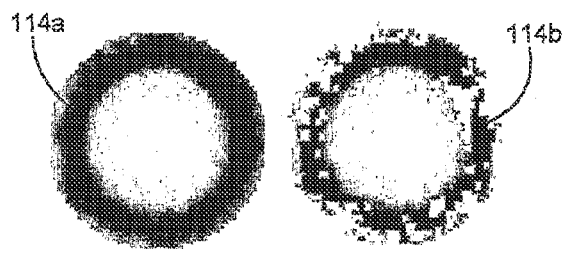
FIG. 4A-C show test functions for viral capsid structures (A, B and C) in electron micrographs employing no coefficient reduction (None) or 80% of the coefficients exhibiting least variation (VAR)
Figure 4B:
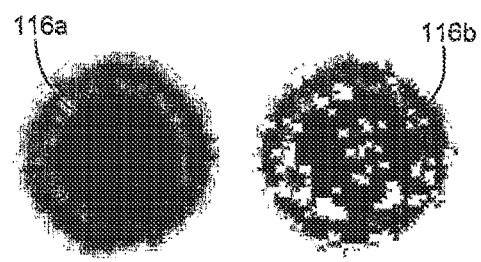
Figure 4C:
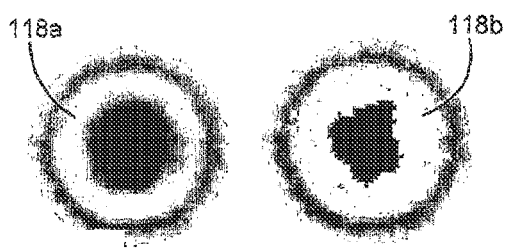

FIGS. 4A-C illustrate the test functions obtained using all coefficients or only those 80% of the varying coefficients identified exhibiting the least variance according to the variance ranking. Clearly, the size of the DNA core varies in the test function for the C capsid and hence the most uncertain points have been eliminated in the right hand images 114b, 116b and 118b. Accordingly, the test functions obtained by reducing the number of coefficients in this manner were employed routinely.

The deformations may then be synthesized. Since the structures analyzed were assumed to be both oriented in any direction and linearly deformed in any direction, these features must be automatically applied to the test function when analyzing an image. The information provided by the behavior of the matching function when deforming the test function is also of interest for and has been exploited in a similar situation. While maintaining image B and the test function $f_c$ fixed and varying the deformation T, analysis of the matching function $g(T)=M(f_C, \{B(Tx_k)\}_k)$ (where the sequence) $\{x_k\}_k$ is obtained from the production of the test functions performed. In order to describe T in terms of the parameters ($\phi_R$, $\bar{r}$, d, $\phi_D$)∈([0, 2π], [$\bar{r}_0$, $\bar{r}_1$], [$d_0$, $d_1$], [0,2π])=$T_{bound}$, the following assumptions are made:

(i) For certain T∈$T_{bound}$, the deformed test function represents the structure most similar to the object in the image. It is assumed that this T is the one that maximizes g.

(ii) The T associated with the maximal deformation should be localized within the interior of the deformation set, and not on the boundary. Under these conditions, even if g is maximized outside the set (i.e. the structure is too large, too small or too badly deformed), matching with the nearest boundary points could still be high.

To be considered identified, a structure should match these criteria. Maximization of the matching function Was performed with a reversed steepest descent scheme, using the non-deformed test function as a starting point and approximating the derivative as an eight-point, centered difference scheme (i.e. two points for each variable in the deformation).

Figure 5A:
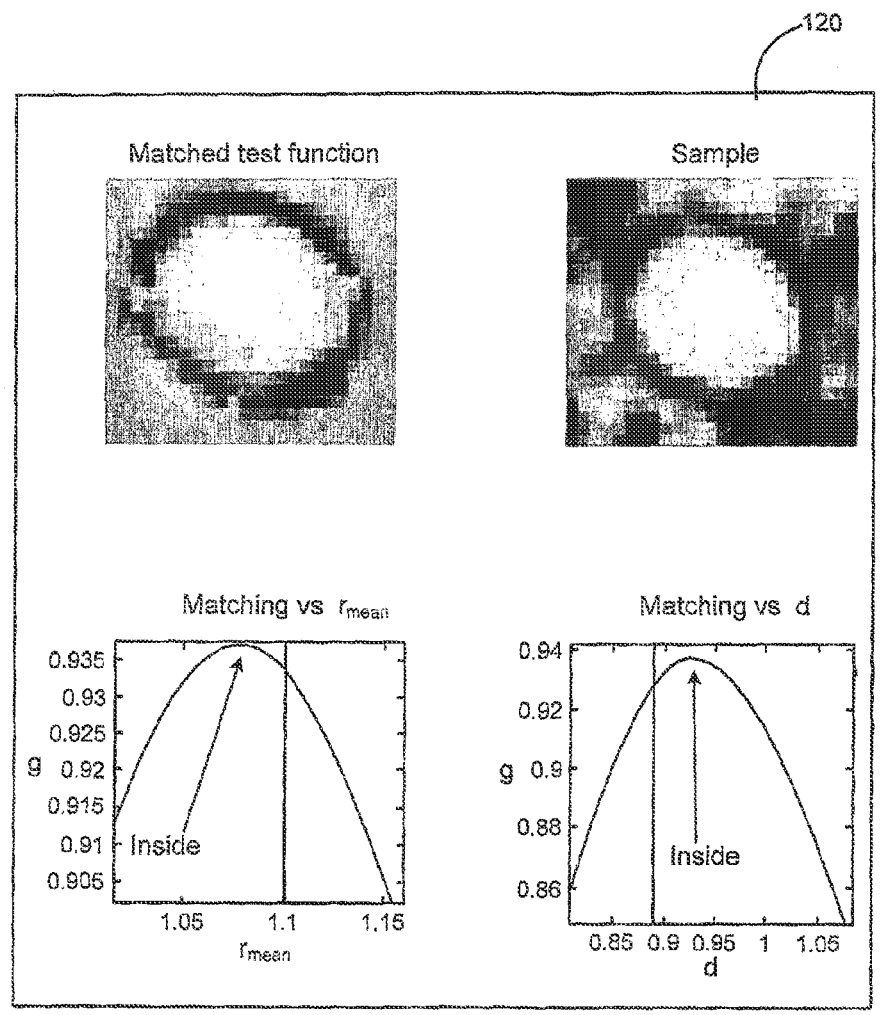
FIG. 5A shows a matching of a test function A to an authentic capsid structure and to a similar but false structure.
Figure 5B:
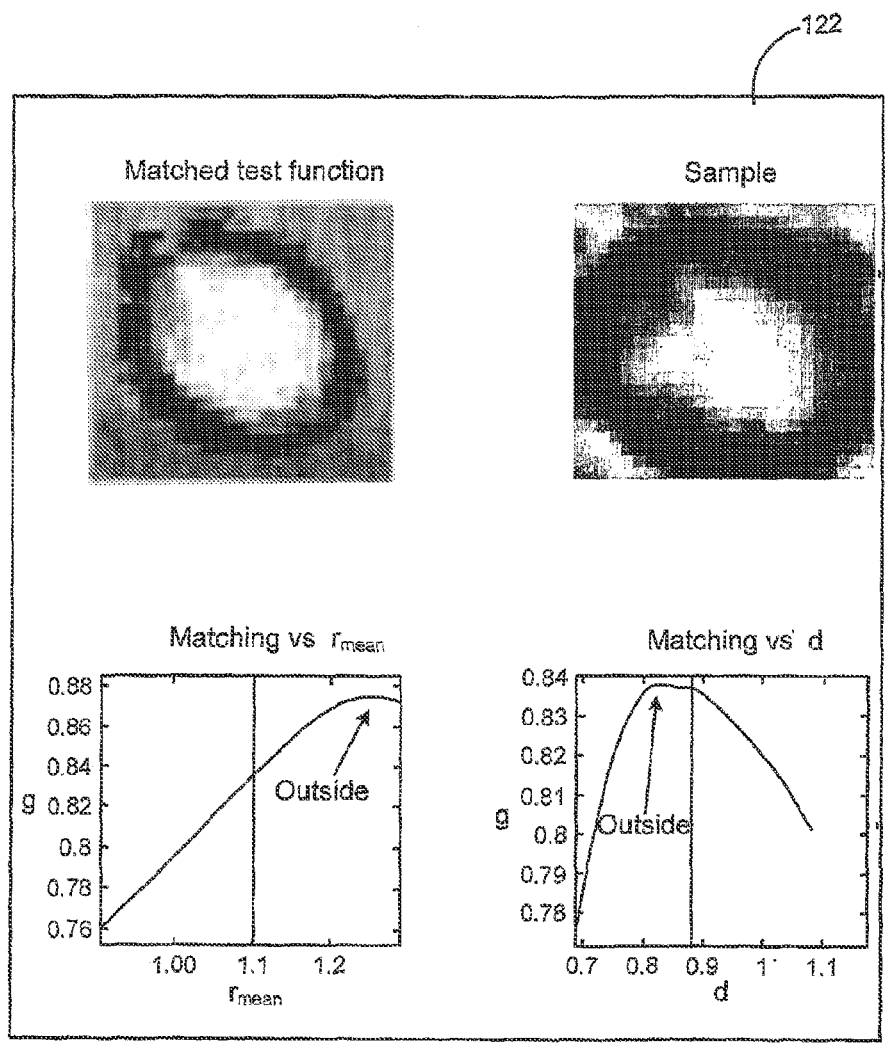
FIG. 5BA shows a matching of a test function B to an authentic capsid structure and to a similar but false structure.

Application of the matching criteria employed is depicted in FIGS. 5 and 6. FIG. 5A illustrates how these criteria work when applied to an authentic A capsid, as well as to a similar but false structure. In image 120 (called A) an authentic capsid is shown. When the test function is deformed, the graphs illustrates how the matching function g varies with radial size ($\bar{r}$) and degree of deformation (d) from the point in the set of admissible deformations that maximizes g. The deformed test function has an appearance similar to that of the sample, and the deformation is inside the boundaries. The classification should thus be positive. In image 122 (called B) in FIG. 5B, unlike the image. A, the point in the deformation set that maximizes (g) is situated on the boundary and the graphs show a higher matching value outside of this set. Thus, this classification should be negative. In this case the deformation boundaries were set to ($\phi_R$, $\bar{r}$, d, $\phi_D$)∈([0, 2π), [0.89, 1.1][0.89, 1.13], 0, 2π]) for illustrative purposes.

Viral capsids exit the nucleus by budding through the membrane of this organelle. In connection with this process it is difficult to discriminate between viral and other structures, as shown in images 126a and 126b in FIG. 6. The structure marked with a blue cross fulfills matching criteria (i) and (ii) whereas those marked with a red circle only fulfill criterion (i). In this figure, a blue cross indicates a point in the image where the match between the test function and the capsid structure match is better than 0.8 and the degree of deformation is acceptable. A red circle indicates a point, at which this match is better than 0.8, but where the degree of deformation is not admissible. The structure marked as a match has a matching of 0.94, which is very high.

Virus particle structures in an electron microscopic image may then be identified. In order to search for structures in an image (B) similar to the test function $f_c$, eq 2b is expanded to convolutions. The matching of the test function at a point (m) can thus be expressed as $$M_{B,f_C}(m) = \sup_{T \in T_{bound}} M(f_C, \{B(m + Tx_k)\}_k)$$

However, this procedure is highly time-consuming. It can be accelerated by making a few observations and assumptions:

(i) The deformed variants of the test functions are not orthogonal to one another, and because these structures are essentially independent of rotation, the match of the non-deformed test function is better than that of a certain value to any admissible deformed structure of the same kind.

(ii) Since translation deforms a structure further, matching to the non-deformed test function is assumed to be higher at the actual position of a virus particle than at locations at least one diameter of the test function distant from this position.

Implementing these criteria, one can identify a subset of potentially interesting points within the larger image. Thereafter further analysis of this set employing the optimization described in the preceding section can be performed. This approach provides a final set of points in the image that are associated with matching values of P={$M_j$}$_j$. In order to ensure inclusion of all interesting positions in an image the threshold value connected with assumption (i) above was set to 0.5.

In the post-processing of the final set, the virus particles are counted. There is no threshold value (t) that can distinguish between authentic and false structures in all images, i.e., the assignment of structures employing this procedure does not agree completely with that done by an experienced virologist. Setting a threshold level is therefore not an option. Instead, a positive probability function PPF:[−1, 1]→[0, 1] can be used to determine the probability that a can given point associated with a certain matching value is actually associated with the virus particle. This extension of the positive, predictive value (PPV) is obtained by calculating the ratio between the number of correctly identified structures and the total number of structures identified with a certain matching value. Thus, for a set (P) of structures identified by this procedure containing the subset $P_{correct}$ of points associated with virus particles of a given kind, $$PPF(M) = \frac{\#\{M_k \in P_{correct}; M \le M_k < M + \varepsilon\}}{\#\{M_k \in P; M \le M_k < M + \varepsilon\}}.$$

In order to obtain a smooth and monotonically increasing function 0.05 was chosen as the value for ε. The probability function indicating the expected number (N) of structures in the image is $$E(N) = \sum_{M \in P} PPF(M).$$

The FNR/FPR accuracy of the method may be described as follow. In order to organize viral particles seen in electron micrographs according to their stage of maturation, a model such as that described here, is required to portray each particular stage. Furthermore, for this model to be useful for the detection and quantization of virus particles in such images it must also be able to reject spurious structures. Thus, an ideal model should detect all possible images of virus Particles of different kinds, but nothing else located in the same space, i.e., in the background. In order to characterize our model in this respect the commonly false negative (FNR) and false positive (FPR) ratios were utilized. The FNR is defined as the ratio between she number of authentic virus particles rejected incorrectly by the method and the actual number of authentic particles, while the FPR is the ratio between the number of spurious structures identified as being authentic and the total number of structures considered so be authentic by this approach. Thus, both of these ratios lie between 0 and 1, with 0 being ideal.

In order to determine the number of virus particles on the basis of the information provided by the set of matching values acquired by searching through an image, the positive probability function PPF described above may be used. The expected number of particles identified was compared with the true number of particles present in the image to obtain a mean and standard deviation of the counting error. In addition, so evaluate whether there was a systematic mean difference, i.e., whether the procedure identifies on the average too many or too few particle, the $H_0$ hypothesis that: "The mean difference=0" was tested.

The standardization and testing were carried out on separate sets of images, 2 for training and 12 for testing. The number of samples used for standardization was 4, 7 and 10 for the A, B, and C test functions, respectively. The test images contained a total of 53 A capsids, 239 B capsids and 83 C capsids, and the boundaries of deformation were set at $(\phi_R, \bar{r}, d, \phi_D) \in ([0, 2\pi], [0.83, 1.2], [0.83, 1.2], [0, 2\pi])$.

Figure 7A:
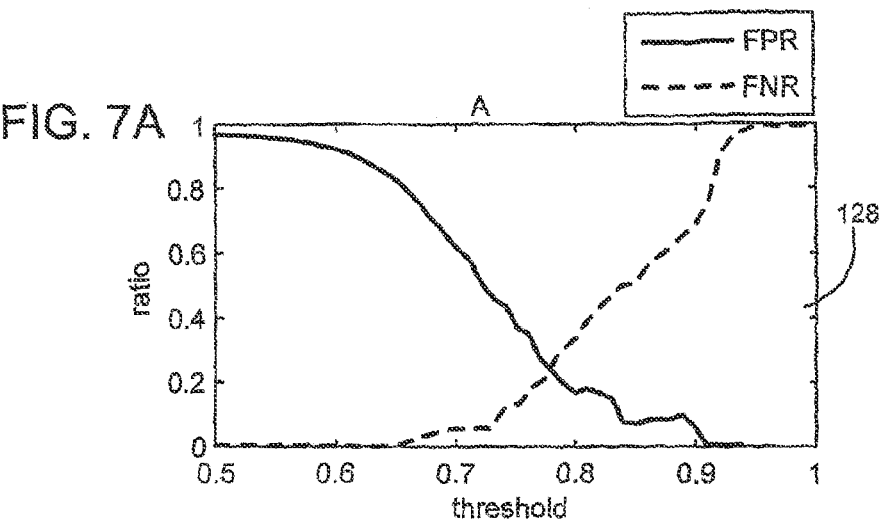
FIG. 7A-C show false positive (FPR) and false negative (FNR) ratios for the different test functions A, B and C, respectively.
Figure 7B:
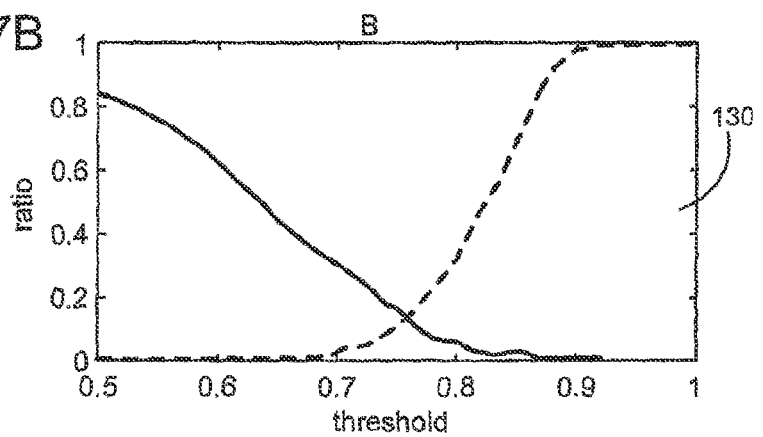
Figure 7C:
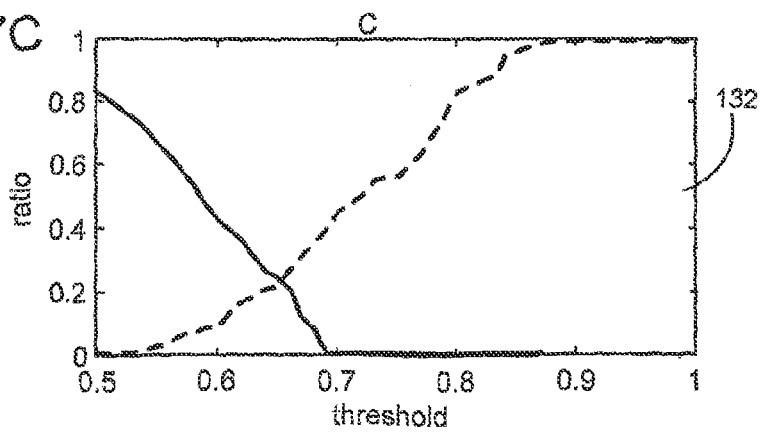

The false negative (FNR) and false positive (FPR) ratios may be described as follows. The method was evaluated by comparing our results with those of experienced virologists. The FPR and FNR were calculated as a function of the threshold value for the matching measure, as best shown in graphs 128, 130 and 132 in FIGS. 7A-C, respectively. The FNR is defined as the ratio between the number of authentic structures rejected incorrectly by the procedure employing a certain threshold value for the matching measure, and the actual number of virus particles present as determined, by a virologist. Analogously, the FPR is the ratio between the number of spurious structures identified as being authentic and the total number of structures considered to be authentic by this procedure. For comparison with other methods, cross-over of the curves occurred at 0.25 for the A test function, 0.13 for the B test function and at 0.23 for the C test function.

Figure 8:
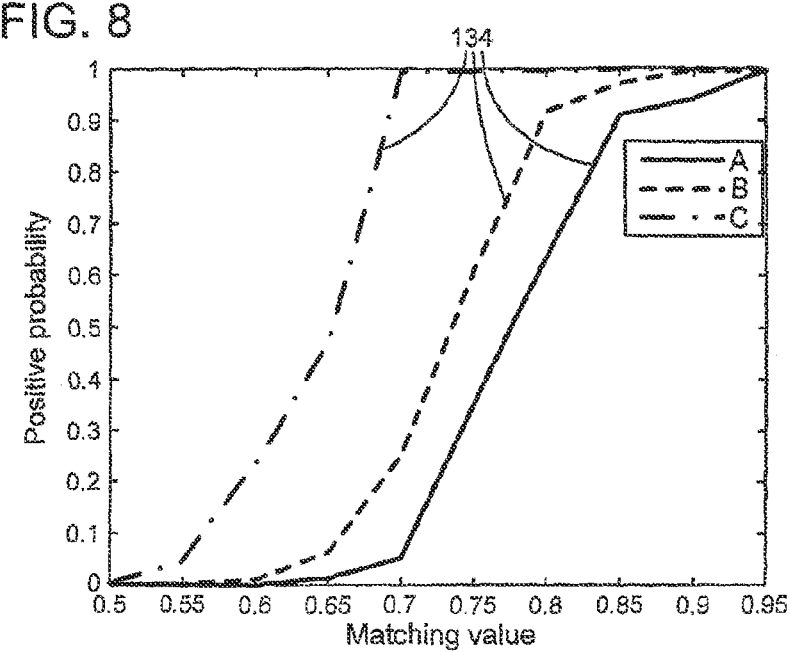
FIG. 8 shows the positive probability functions (PPFs) for the test functions A, B and C.

Quantization of structures in electron micrographs may be described as shown below. The PPF values 134 calculated from the results presented above are shown in FIG. 8. The graph depicts the relative frequency of virus particles identified correctly by the procedure at a certain matching value. For comparison an ideal method providing complete separation between true and false structures would result in a Heaviside step function at some threshold value. For comparison, an ideal case procedure providing complete separation between true and false structures would result in a Heaviside step function at some threshold value.

Figure 9:
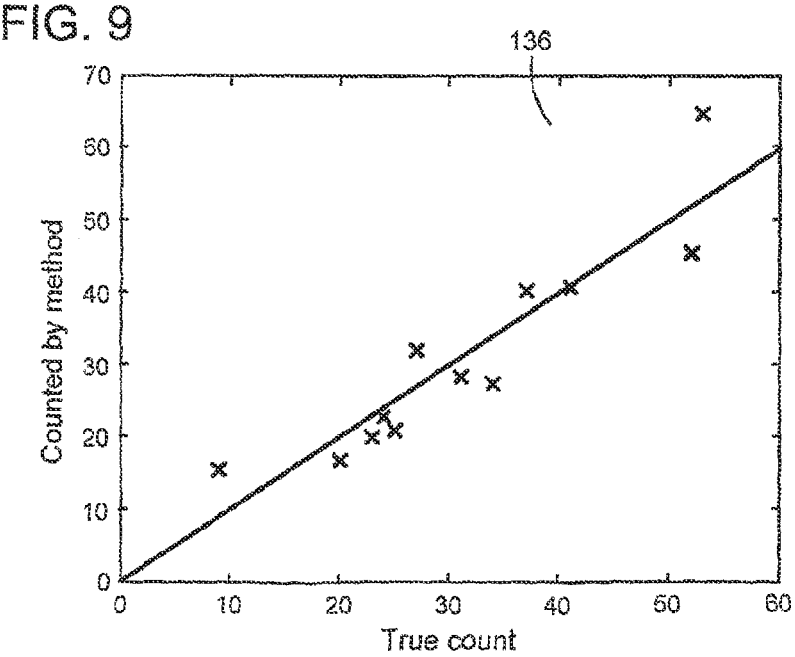
FIG. 9 shows a comparison of the actual total number of viral structures present in a set of test images (X-axis) as determined by a virologist to the number identified by our procedure (Y-axis)

A scatter plot 136 of the total number of viral particles identified as being present in a set of test images by our procedure in comparison to the correct number as determined by a virologist is shown in FIG. 9 together with the identity function. The line in this graph depicts the identity function. The mean difference is 0.16 and the standard deviation 5.63. The significance level of the null hypothesis $H_0$, i.e., "The mean difference=0", is 0.92. Clearly, there is close similarity between these two values (mean dIfference=0.16, standard deviation of 5.63), which in the ideal case would be points on the identity function. The fact that the level of significance of $H_0$ was 0.92 according to Student's t-test indicates that there was a fair probability that there was no systematic difference between these two approaches in mean. These results show that fast screening of the total number of viral structures at different stages of maturation in a large set of electron micrographs, a task that is otherwise both time-consuming and tedious for the expert, can be accomplished rapidly and reliably with our automated procedure.

Figure 10:
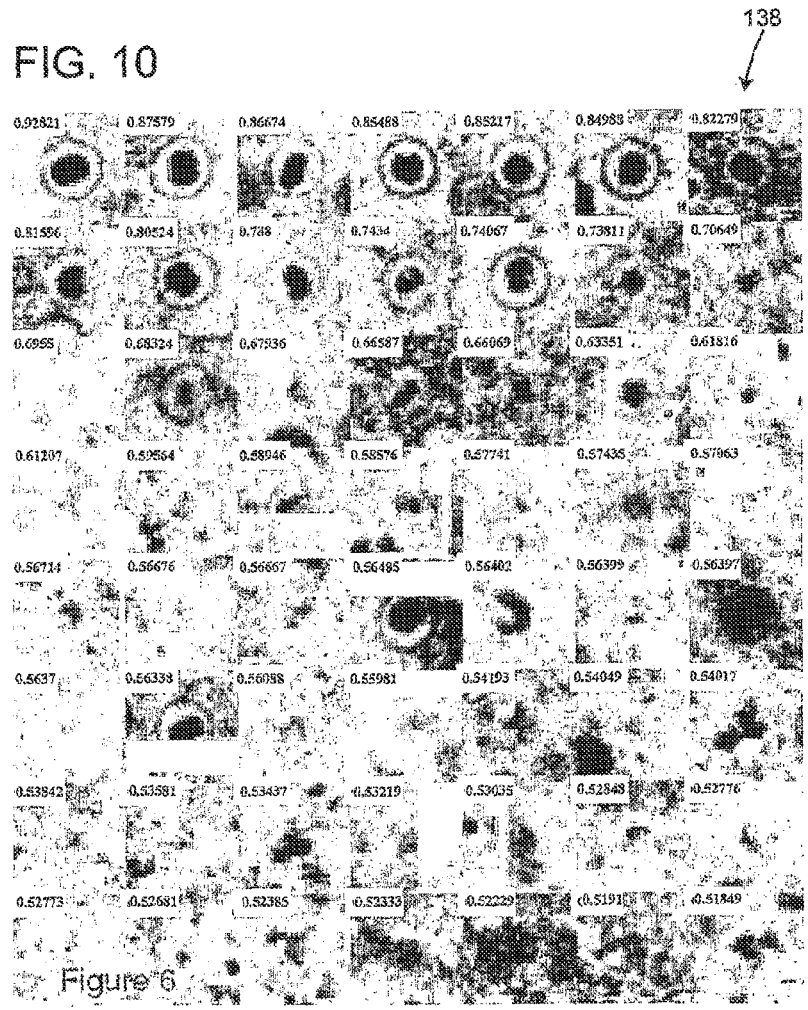
FIG. 10 shows an automated production of a map that identifies locations of interest in an electron micrograph illustrated here for the C test function.

On the basis of the set of positions in an image 138 at which structures of interest are located a map as shown in FIG. 10 can be produced. This facilitates the manual counting of these structures considerably and also gives a framework for manual analysis. Instead of simply counting and comparing structures in an unprocessed image, the virologist is aided considerably in this task by the availability of such a map. The various structures are sorted left to right in order of descending matching values beginning at the left side of doe top row.

When investigating the process of virus assembly, information concerning the structural topology in relationship to the stage of maturation is usually not available or vaguely defined. Therefore, tools for sorting and classifying virus particles at different stages of maturation are required. Once a few starting points have been obtained by classifying a set of obvious structures, these can be used to expand the set or classified structures by identifying similar structures with the matching function employed. This approach helps make the mapping of virus maturation in electron micrographs rapid, reliable and easy to describe.

While the present invention has been described in accordance with preferred compositions and embodiments, it is to be understood that certain substitutions and alterations may be made thereto without departing from the spirit and scope of the following claims.

The invention claimed is:

1. A method of identification and characterization of structures, comprising:
   selecting structures in a first image, the structures having a first physical shape deformed in a first direction, the structures consisting essentially of infectious agents, proteins, antibodies and liposomes;
   changing the selected structures to a second physical shape different from the first physical shape;
   using the transformed structures of the second physical shape to form a plurality of templates;
   identifying a new structure in a second image, the new structure having the first physical shape;
   deforming each template in the first direction;
   determining which template is a preferred template that best matches the first physical shape of the new structure; and
   deforming a plurality of templates to a shape of a new asymmetrical shaped structure and testing each deformed template to verify that the preferred template most accurately matches the new asymmetrical shaped structure in the second image.

2. The method according to claim 1, wherein the method further comprises mechanically deforming an infectious agent from an asymmetrical shape or a substantially circular shape.

3. The method according to claim 2, wherein the method further comprises rotating the infectious agent prior to deforming the infectious agent.

4. The method according to claim 3, wherein the method further comprises rotating the infectious agent subsequent to the deformation of the infectious agent.

5. The method according to claim 1, wherein the method further comprises testing other templates to verify that the preferred template provides the best matching.

6. The method according to claim 5, wherein the method further comprises selecting structures based on parameters related to size and degree of the asymmetrical shape of the structures.

7. The method according to claim 1, wherein the method further comprises testing other directions than the first direction to verify that the first direction of deformation of the preferred template provides the best matching of the new asymmetrical shaped structure.

8. The method according to claim 7, wherein the method further comprises determining that the matching is less accurate in directions other than the first direction.

9. The method according to claim 1, wherein the method further comprises determining a maturity stage of the new asymmetrical shaped structure based on the preferred template.

10. The method according to claim 1, wherein the method further comprises filtering structures that are disposed within a radial distance of the new asymmetrical shaped structure.

* * * * *